April 27, 1937.  E. H. LOCKWOOD  2,078,676
CONTROL SYSTEM
Filed Feb. 14, 1935
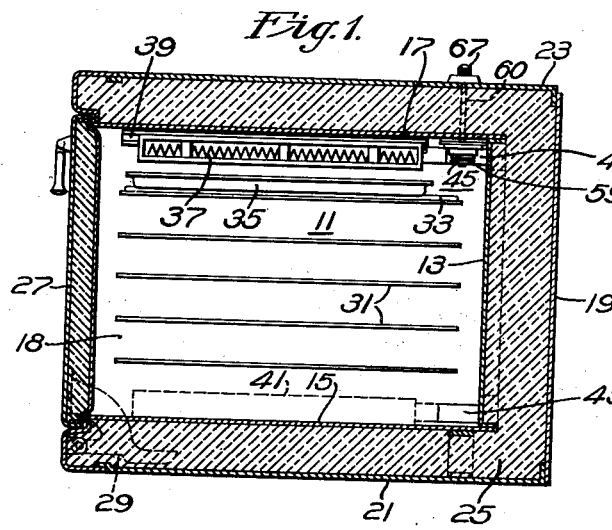
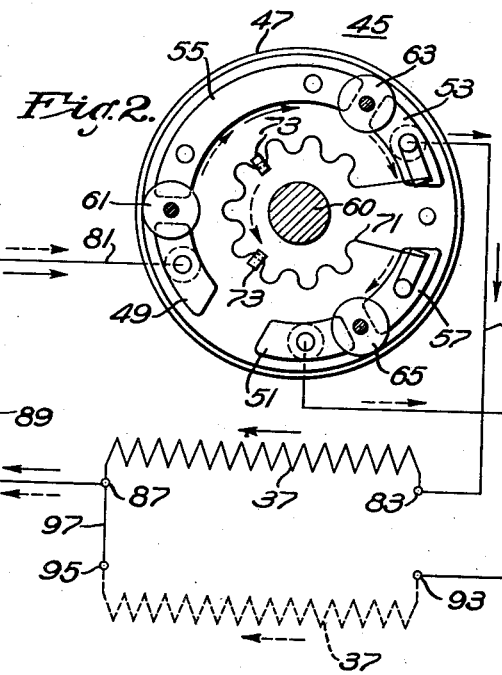
WITNESSES:
INVENTOR
Edwin H. Lockwood.
BY
ATTORNEY Patented Apr. 27, 1937

2,078,676

UNITED STATES PATENT OFFICE 2,078,676

CONTROL SYSTEM

Edwin H. Lockwood, Mansfield, Ohio, assignor to Westinghouse Electric & Manufacturing Company, East Pittsburgh, Pa., a corporation of Pennsylvania Application February 14, 1935, Serial No. 6,469

9 Claims. (Cl. 219—20)

My invention relates to electric ranges and particularly to control systems for the heating element of an electric oven.

An object of my invention is to provide a relatively simple control system for a single heating element selectively locatable in two different positions in an oven.

Another object of my invention is to provide a control system for an electric heating element, the system including a thermally-actuable switch for the heating element whose operating characteristic is varied in accordance with the position of the heating element relatively to the switch.

Other objects of my invention will either be apparent from a description of a system embodying my invention or will be specifically pointed out hereinafter.

In practicing my invention, I provide a cooking chamber having members so arranged as to permit of a single heating element being used in two different operative positions therein and controlled in both said positions by a thermally actuable switch located in a predetermined part of the cooking chamber. The control system and the parts constituting the same are such that the characteristic of the thermal switch is different when the heating element is located closely adjacent thereto than when it is located further away therefrom in the cooking chamber.

In the single sheet of drawing:

Figure 1 is a view in vertical section through a range oven showing parts embodied in my system; and Fig. 2 is a diagram of connections particularly showing the elements of my improved control system.

Referring first to Fig. 1 of the drawing, I have there illustrated a cooking chamber 11 as being defined in part by a side wall 18, a plurality of other inner walls 13, 15 and 17, and a plurality of outer walls 19, 21 and 23 corresponding to the latter, these inner and outer walls being spaced apart from each other in pairs to provide a space therebetween which may be filled with heat-insulating material 25, in a manner well known in the art. It will be understood that the necessary other side walls, inner and outer, (not shown) of similar construction to those illustrated, are provided. The range oven structure shown is completed by a pivotally mounted door 27 which may be supported by hinges 29. The details of construction of the inner and outer casings and of the door constitute no particular part of my present invention, but are shown for illustrative purposes only.

Each inner side wall (such as 18) of the oven structure includes a plurality of horizontally-extending glides 31, to receive thereon a grid 33, upon which may be located a food receiving container 35, here shown as a relatively shallow pan, such as may be used in broiling a steak.

I provide further a single electric heating element 37, which is so designed and built as to be locatable in either the top portion of the oven or cooking chamber 11, as by being supported by opposed top glides 39, or adjacent to the bottom of the cooking chamber, as indicated by the broken lines 41, showing the general outlines of the heating element. I provide further a terminal structure 43 at the bottom of the oven and a similar terminal structure 43 at the top of the oven, fixedly secured therein so that when the heating unit 37 is supported by the glides 39 in the top of the chamber, terminal members thereon (not shown in detail in the drawing) will operatively engage the upper terminal structure 43 so that the heating unit may be suitably energized in a manner to be hereinafter set forth in detail or it may also be similarly energized when located in the bottom portion of the chamber.

Means for controlling the energization of the heating element 37 in both of its operative positions in accordance with the temperature of the cooking chamber 11 comprises a thermally-actuable switch 45 which, as shown more particularly in Fig. 1 of the drawing, is located directly in the oven chamber 11, preferably near one upper side portion thereof.

This thermally actuable switch, shown in detail in Fig. 2 of the drawing includes a base member 47 having insulatedly supported thereon a plurality of fixed contact and terminal members 49, 51 and 53 and additional fixed contact members 55 and 57, all corresponding to arcs of the same circle. A snap-acting bimetallic disc 59, shown more particularly in Fig. 1 of the drawing and supported by the base 47 by means of a stud 60 is of the type disclosed and claimed in Patent No. 1,448,240 to J. A. Spencer. Briefly, this bimetal disc is dished in one direction, and remains in that (circuit-closing) position until, under predetermined temperature conditions, it suddenly reverses its dishing or curvature to the opposite direction, when contact bridging members 61, 63 and 65 insulatedly supported on the disc adjacent to the periphery thereof will be moved out of engagement with the fixed contact members 49—55, 55—53 and 57—51, respectively. While I have illustrated a specific embodiment of such switch, I do not desire to be limited thereto, as this has been shown for illustrative purposes, and modifications may be made thereon. Means for adjusting the value of the temperatures at which the disc 59 will move with a snap-action from one position to another position is provided in the form of an adjusting knob 67, secured to the outer end of stud 60 having screw threaded engagement with the base 47 and having the disc 59 mounted thereon, all in a manner now well known in the art.

A snap-acting bimetallic disc switch of this kind has the characteristic that a relatively large variation in temperature is necessary to cause the switch to move from one of its operative positions to its opposite operative and limiting position. That is, if the thermally actuable switch 45 has been so adjusted, by means of the knob 67, that it will open the circuit at, say, 550° F., the disc, when dependent upon its own characteristics only will not return to its initial position where the contact bridging members are in engagement with the fixed contact members until the temperature has dropped to a value on the order of 400° F., that is, it requires a variation of temperature of about 150° F., to cause the switch to move from its open position to its closed position.

However, in order to desirably reduce this temperature differential of operation, I provide a small auxiliary electric heater 71 which is insulatedly supported between the base and the disc as by small refractory supports 73 fixed in the base 47. The current carrying capacity of auxiliary heater 71 is in accordance with that of the heater 37. The terminals or ends of element 71 are connected to terminal members 53 and 57, respectively.

Means for energizing the heating element 37 may include a pair of supply circuit conductors 75 and 77, as well as a double pole toggle or snap switch 79, which may be of a kind now used for such purposes. One terminal of the switch 79 is connected to terminal 49 of switch 45 by a conductor 81 and terminal 53 of switch 45 is connected to a contact socket 83 of the upper fixed terminal structure 43 by a conductor 85. Reference to Fig. 2 of the drawing shows the heating element 37 in one of its operative positions, it being shown schematically by full lines indicating a resistor. The other fixed contact terminal or socket 87 to which the other terminal of heater 37 is connected when the heater has been moved on the glides 39 to its proper operative position, is connected to the other terminal of switch 79 by a conductor 89.

Terminal 51 of switch 45 is connected by a conductor 91 to one terminal 93 of the lower fixed terminal structure 43 while the other fixed terminal 95 of the same terminal structure is connected by a conductor 97 to the upper fixed terminal 87. Heating element 37 has been shown in broken lines in electrical connection with the terminals 93 and 95 to indicate the connections thereof to the circuits when the heater is in the lowermost of its two positions.

As has already been stated above, the auxiliary heater 71 is provided to reduce the temperature differential of operation, that is, to cause the thermostatic disc 59 to more closely control the temperature, or to put it in other words, to insure that the temperature variations from the average value in the cooking chamber will not be too great. When the heater 37 is in the lowermost position, it is obvious that with the thermostatic switch located in the upper part of the cooking chamber, the heating element 37 will have little or no direct heating effect upon the disc, since there will be an appreciable distance therebetween, and the thermostat will, therefore, be controlled in accordance with chamber temperature. If, however, the heating unit 37 is located in its uppermost position, there will be a tendency for the thermostatic switch 45 to be affected by and controlled to a lesser or a greater extent in accordance with the temperature of the heater, so that proper control of the chamber temperature would not be assured were it not for the special arrangement of auxiliary heater 71, as described below. Thus, if the container 35 were to hold a steak which is to be broiled by direct radiated heat from the heating element 37, the thermostatic switch 45 would tend to open at a lower temperature than is desired, since it would be actuated by or would respond to not only the heat from the auxiliary heater 71, but also the heat from the main heater 37.

Reference to Fig. 2 of the drawing will show that when the heater 37 is located in its uppermost position, the auxiliary heater 71 is not in the energizing circuit thereof, but that when heater 37 is in its lowermost position, the auxiliary heater 71 is connected in series circuit relation with the main heater. Thus, if heater 37 is in its uppermost position, auxiliary heater 71 is automatically deenergized by the heating element 37 having been removed from its lowermost position and placed in its uppermost position.

The toggle switch 79 is to be considered as general only, since any other type of switch may be utilized for the equivalent purpose of controlling the energization of the single oven heating element, irrespective of whether the same is located at the top of the cooking chamber as required for broiling operations, or whether it is located at the bottom portion thereof, as is desirable for ordinary cooking and roasting operations.

The system embodying my invention thus provides a relatively simple means for insuring that the desired relatively high temperature of an electric heating element will be obtained when the same is used in a broiling operation and that a closer than ordinary temperature differential of the thermally actuable switch is obtained when the main heating element is located in its ordinary position at a greater distance from the thermally actuable switch.

It may also be pointed out that the auxiliary radiant heater 71 is protected against damage by reason of excessive current in case an operator were to insert two main heating units in the oven at the same time, since it would be connected in series circuit with only one such heating unit.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a control system, a range oven heater adapted to be selectively located in two different positions in a range oven, a thermally-actuable switch located in the range oven nearer one of said positions and controlling the energization of the heater in either of its positions, and heat-emitting means directly operatively associated with the thermally-actuable switch and arranged to counterbalance the loss of heat received by the switch from the heater only when the latter is in the position more remote from said switch.

2. In a control system, a range oven heater adapted to be selectively located at the top or the bottom of the range oven, a thermally-actuable switch located in the range oven at the top portion thereof and controlling the energization of the heater in either of its positions, and heat-emitting means directly operatively associated with the thermally-actuable switch and arranged to counterbalance the loss of heat received by the switch from the heater only when the latter is in the bottom of the range oven.

3. In a control system, an electric heating element associated with a range oven and adapted to be selectively located at the top or at the bottom of the oven, a thermally-actuable switch located in the oven at the top portion, means including terminal members and conductors between the switch and the terminal members to permit the switch to control the energization of the heating element in either of its positions, a manually-operable switch cooperating with the thermal switch to effect energization of the heating element in either of its positions, and an auxiliary heating element in heat-transferring relation to the thermal switch and selectively energized in accordance with the position of the first-named electric heating element in the oven.

4. In a control system, an electric heating element adapted to be selectively located at the top or at the bottom of a chamber, a thermally-actuable switch located in one portion of the chamber and adapted to control the energization of the heating element in either of its positions, and an auxiliary heating element in heat-transferring relation to the thermal switch and energized in accordance with the position of the heating element in the chamber.

5. In a control system, a main electric heating element adapted to be selectively located in two different positions in a cooking chamber, a thermally-actuable switch having an auxiliary electric heating element in heat-transferring relation therewith and means including terminal members and conductors therebetween to ensure inclusion of the auxiliary heating element in electric circuit with the main heating element in only one of its operative positions.

6. In a control system, a main electric heating element adapted to be selectively located in two different operative positions in a cooking chamber, a thermally-actuable switch having a plurality of terminals and including an auxiliary heating element in heat-transferring relation therewith and controlled thereby, and means including contact terminals for the main heating element in both of its positions and conductors between the switch terminals and the contact terminals to effect energization of the auxiliary heating element in only one of the two operative positions of the main heating element.

7. In a control system, a main electric heating element adapted to be selectively located in two different operative positions in a cooking chamber, a thermally-actuable switch having a plurality of terminals and including an auxiliary heating element in heat-transferring relation therewith and controlled thereby, said switch being located adjacent to the main heating element in one of its positions, and means including contact terminals for the main heating element in both of its positions, and conductors between the switch terminals and the contact terminals to effect energization of the auxiliary heating element only when the main heating element is located away from said switch.

8. In a control system, a main electric heating element adapted to be selectively located at the top or at the bottom of a cooking chamber, a thermally-actuable switch having a plurality of terminals and an auxiliary electric heating element in heat-transferring relation therewith and controlled thereby and means including contact terminals for the main heating element in both of its positions and conductors between the switch terminals and the contact terminals to effect deenergization of the auxiliary heating element when the main heating element is located at the top of the cooking chamber and to effect energization thereof when the main heating element is located at the bottom of the cooking chamber.

9. In a control system, a thermally actuable switch and a heater adapted to be located at different distances from each other, said switch controlling the energization of said heater at each location, and heat-emitting means directly operatively associated with said switch and arranged to compensate for the loss of heat received by the switch from the heater only at a predetermined greater distance therefrom as compared with a predetermined lesser distance therefrom.

EDWIN H. LOCKWOOD.